UNITED STATES PATENT OFFICE.

ARTHUR HEINEMANN, OF WEST KENSINGTON, LONDON, ENGLAND.

DEPOLYMERIZATION OF TURPENTINE OR TURPENTINE-OIL.

1,092,838. Specification of Letters Patent. Patented Apr. 14, 1914.

No Drawing. Application filed January 21, 1913. Serial No. 743,255.

*To all whom it may concern:*

Be it known that I, ARTHUR HEINEMANN, a subject of the King of Prussia, residing at 223 North End road, West Kensington, London, England, have invented new and useful Improvements Relating to the Depolymerization of Turpentine or Turpentine-Oil, of which the following is a specification.

The invention consists of an improved process for the depolymerization of turpentine oil or crude turpentine, *i. e.*, of the substances of which said turpentine oil and crude turpentine are composed, into compounds boiling below 100° C., especially isoprene.

Various processes or methods for effecting the depolymerization of turpentine oil have been suggested. According to one process it was proposed to mix the vapors of turpentine oil with a suitable gas such as carbon dioxid, hydrogen, nitrogen and the like, and in another process to mix said vapors with an inert gas such as nitrogen, previous to the introduction of the turpentine vapors into the heated tube in which the depolymerization is effected.

According to the present invention the vapors of turpentine oil or the vapors of crude turpentine, as the case may be, are mixed with steam and the mixture is passed over suitable heated surfaces. The advantages accruing from the employment of steam instead of the above named gases are numerous. Steam can be produced at practically little cost, whereas said gases can only be obtained, at a much greater cost, by the use of expensive plant. A more thorough division of the turpentine vapors occurs when steam is used. Consequently a higher yield of hydrocarbons is obtained. Moreover less skill and watchfulness are required in the case of the present process, and the condensation of the products of the process can be effected by means of a simple plant.

The improved process may be carried out in the following manner:—The steam, preferably superheated steam, generated in any suitable apparatus, is passed into a vessel containing the turpentine oil or crude turpentine, and is caused to percolate through the contents of the vessel, which is maintained at a suitable temperature. The steam as it percolates through the turpentine oil or crude turpentine takes up or absorbs a certain quantity thereof, the exact amount taken up or absorbed depending on the temperature and pressure of the steam. The mixed steam and turpentine vapors are then led into the tube, retort or structure in which the depolymerization is to be effected. The depolymerization products are eventually condensed in any well known manner, such for instance as by subjecting them to the cooling actions of water and a freezing mixture. The tube, retort or chamber in which the depolymerization is effected may be of any suitable metal or refractory material, but it must be of such size and be so constructed as to enable depolymerization of the turpentine vapors to take place, being for this purpose provided with baffle plates or otherwise constructed that the vapors will be compelled to follow a sinuous course and thus remain for a sufficient length of time in contact with the heated surfaces. The temperature to which said tube, retort or structure may be heated is between 650° C. and 900° C. The latter temperature may be exceeded but care must be taken that the temperature, about 950° C., at which steam is decomposed into its constituent elements is not reached. A suitable temperature which has been found to be satisfactory when ordinary steam is used is 750° C. When, as last mentioned, the turpentine vapors are mixed with ordinary steam and the tube, retort or structure in which the depolymerization is effected is heated to 750° C. good results may be obtained with a vertically disposed tubular structure having a cross-section of 0.25 square meter and provided with, say, twelve baffle plates arranged in such manner that the mixture of vapors and steam is compelled to follow a sinuous path. In this case the quantity of steam which may be led into the turpentine vapors or mixed therewith during the course of an hour would be that resulting from the evaporation of 200 liters of water.

The yield of hydrocarbons boiling below 100° C. obtained by the present process is 40–50 per cent. or thereabout of the material used, two thirds of this percentage being isoprene.

Having now described my invention what I have invented and desire to secure by Letters Patent of the United States is as follows:—

An improved process for the depolymerization of turpentine into compounds boiling below 100° C. consisting in first admixing steam with the turpentine vapors and then passing the mixture over suitable surfaces heated to a temperature ranging between 650° C. and 900° C., substantially as described.

In testimony whereof I have signed my name to this specification in the presence of two subscribing witnesses.

ARTHUR HEINEMANN.

Witnesses:
SHIRLEY HILTON ROBINSON,
ETHEL M. WEBB.